(12) United States Patent
Kumar et al.

(10) Patent No.: US 9,928,152 B2
(45) Date of Patent: Mar. 27, 2018

(54) COMPUTER IMPLEMENTED SYSTEM AND METHOD TO NON-INTRUSIVE SENSING AND INSTRUMENTATION OF WORK PROCESS

(71) Applicant: Tata Consultancy Services Ltd., Mumbai, Maharashtra (IN)

(72) Inventors: Anand Kumar, Pune (IN); Kesav Vithal Nori, Hyderabad (IN); Nikhil Ravindranath Zope, Mumbai (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 136 days.

(21) Appl. No.: 14/631,241

(22) Filed: Feb. 25, 2015

(65) Prior Publication Data

US 2015/0242299 A1 Aug. 27, 2015

(30) Foreign Application Priority Data

Feb. 25, 2014 (IN) ............................ 661/MUM/2014

(51) Int. Cl.
*G06F 9/46* (2006.01)
*G06F 11/34* (2006.01)
(Continued)

(52) U.S. Cl.
CPC ........ *G06F 11/3414* (2013.01); *G06F 9/4881* (2013.01); *G06F 11/3096* (2013.01);
(Continued)

(58) Field of Classification Search
None
See application file for complete search history.

(56) References Cited

U.S. PATENT DOCUMENTS 5,490,097 A 2/1996 Swenson
6,003,011 A 12/1999 Sarin
(Continued)

OTHER PUBLICATIONS

Anand, K., "A Non Intrusive Sensing approach to measure work done by business users while using IT systems," Tata Consultancy Services, © 2012, 6 pp. Available at: https://www.yumpu.com/en/document/view/49081184/a-non-intrusive-sensing-approach-to-measure-work-done-trddc.

(Continued)

*Primary Examiner* — Dong Kim
(74) *Attorney, Agent, or Firm* — Blueshift IP, LLC; Robert Plotkin (57) ABSTRACT

A method(s) and system(s) provide a non-intrusive sensing and instrumentation of work processes performed in computing environment. The method includes providing a predefined collection of work processes covering the entire activities to be performed by the end user on the IT system. Each of the process steps of the work processes are assigned with a meta-data. The method further includes obtaining a plurality of measures for each of the process step and obtaining task performance metrics by analyzing the plurality of measures. Furthermore, the method includes collecting a set of actions being performed by the user on the IT system. The method further includes identifying the work processes performed by the user and subsequently, identifying the task performance measures of the user by comparing the identified work processes with the task performance metrics.

17 Claims, 7 Drawing Sheets

(51) Int. Cl.
*G06F 9/48* (2006.01)
*G06F 11/30* (2006.01)

(52) U.S. Cl.
CPC ...... *G06F 11/3438* (2013.01); *G06F 11/3452* (2013.01); *G06F 11/3476* (2013.01); *G06F 11/3447* (2013.01); *G06F 2201/875* (2013.01)

(56) References Cited

U.S. PATENT DOCUMENTS

| | | | |
|---|---|---|---|
| 6,023,702 A | | 2/2000 | Leisten |
| 6,304,851 B1* | | 10/2001 | Kmack ............ G06Q 10/06316 702/136 |
| 6,877,153 B2 | | 4/2005 | Konnersman |
| 7,925,527 B1 | | 4/2011 | Flam |
| 2008/0109268 A1* | | 5/2008 | Ander ................ G06Q 10/0633 705/7.27 |
| 2008/0270770 A1 | | 10/2008 | Vertes |
| 2014/0012802 A1 | | 1/2014 | Huber |

OTHER PUBLICATIONS

El Shobaki, Mohammed, "On-Chip Monitoring for Non-Intrusive Hardware/Software Observability," Licentiate thesis from the Department of Information Technology, Uppsala University, Sweden, Sep. 24, 2004, 182 pp.
Reichert et al., "ADEPTflex—Supporting Dynamic Changes of Workflows Without Loosing Control", Journal of Intelligent Information Systems, Special Issue on Workflow Management Systems, Mar. 1998, vol. 10, Issue 2, pp. 93-129.
Sheth et al., "Report from the NSF Workshop on Workflow and Process Automation in Information Systms", Computer Science Department, University of Georgia, Technical Report: UGA-C5-TR-96-003, Oct. 1996.
Stohr et al., "Workflow Automation: Overview and Research Issues", Information Systems Frontiers 3:3, 281-296, 2001, Kluwer Academic Publishers, The Netherlands.
W.M.P. van der Aalst et al., "Business Process Management: A Survey", Springer-Verlag Berlin Heidelberg, LNCS 2678, pp. 1-12, 2003.

* cited by examiner

| Therblig | Symbol | Description |
|---|---|---|
| Start | Start | Beginning of a sequence of work activities or process steps. This is the entry point for the process. There can be only one entry point. |
| Stop | Stop | End of the sequence of work activities. This is the exit point for the process. There can be multiple entry points. |
| Read | Read | Obtain information that is presented by an IT system/resource accessible thru the workstation. |
| Write | Write | Provide information that is desired by an IT system/resource accessible thru the workstation. |
| Execute | Execute | Perform an action in the workstation that creates a new instance of the chosen IT system/resource. |
| Evaluate | Evaluate | Evaluate a formula based on passed parameters and return the computed value. |
| Search | Search | Search for information that exists in one of the accessible IT system in the workstation. |
| Select | Select | Select an information placeholder or navigational aid and move on to the next step in the business process hosted by the IT system. |
| Wait | Wait | Wait for the information to be available in IT system. |
| Iterate | Iterate | Define an iteration of sequence of process steps whose execution is repeated till the iteration exit condition is met. Ideally the result of an iteration is used as starting point for the next iteration. |
| Choice | Choice | Test a condition and make a decision as to which sequence of process steps needs to be executed based on the decision. There can be multiple paths but only one can be chosen. |
| Continue | Continue | The continue Therblig is used to indicate the end of an iteration. It can be used to skip the rest of the body of an iterative loop or exit the iteration. |
| Reference | Reference | This Therblig indicates that the execution flow continues inside another process. Execution continues from the next step after completion of all the steps outlined in the referred process. |

COMPUTER IMPLEMENTED SYSTEM AND METHOD TO NON-INTRUSIVE SENSING AND INSTRUMENTATION OF WORK PROCESS

TECHNICAL FIELD

The present disclosure relates, in general, to monitoring work processes in computer systems, and in particular, to a system and method to non-intrusive sensing and instrumentation of work processes performed in Information Technology systems.

DEFINITIONS OF TERMS USED IN THE COMPLETE SPECIFICATION

The expression 'work processes' used hereinafter in the complete specification refers to a definite numbers of steps of work to meet the end objective in a computing environment. Further, the definite numbers of steps of work may also be referred as process steps.

The expression 'direct measures' used hereinafter in the complete specification refers to a set of measures acquired by the primary sensors component. The primary sensors component collates the information collected by event listener and event handler and relates it to the work process definitions. Thus, the direct measures are based on defining variables that have well defined computing phenomena related to them. Further, specifying the direct measures involves preparing a list of variables and/or parameters that correlate to the IT system phenomena and tagging it as metrics information to the process step.

The expression 'indirect measures' used hereinafter in the complete specification refers to a set of measures acquired by the soft sensors component. The soft sensor component generates higher level events based on user defined rules and conditions and processing of data gathered by the primary sensors component. Thus, the indirect measures are based on empirical relationship that can be established on the direct measures. Further, specifying the indirect measures involves preparing a list of variables and/or parameters and identifying an associated measurement function of measurable parameters and then tagging it as metrics information to the process step.

The expression 'atomic actions' used hereinafter in the complete specification refers to a process steps that represents a complete complex network of actions at the lowest level such as leaf level in the hierarchy. The complete complex network of actions when instantiated may result into the end user executing the entire network of actions.

The expression 'task performance measures' used hereinafter in the complete specification refers to a set of indicators that may be used by the organizations to statistically control and assist end users in meeting their desired objectives within the identified delivery constraints. The task performance measures are critical in determining how much effort is necessary to efficiently and effectively accomplish the given amount of work.

The expression 'Therbligs' used hereinafter in the complete specification refers to a set of fundamental elemental motions describing standardized activities required by an individual to perform a manual task in a workplace. This definition is in addition to those expressed in the art.

BACKGROUND

Conventionally, in any IT enabled environment, business users use workstations as the single interface point to access all enterprise IT systems to perform their day to day work. The business users perform IT tasks which straddle across multiple IT systems, in different permutations and combinations to complete their work. Often, as part of management needs of businesses, these users need to report their work performance measures to multiple stakeholders. But, even though the work is performed using IT systems, every business user has their own unique style or way of performing their work and they also adopt different work processes. As a result, it is difficult to standardize work processes across business users and there is no single way of managing such work processes. Similarly, in case of large organizations, many associates play similar roles and perform similar activities (for e.g. developer, manager, tester, designers and the like). But due to variability and lack of standardized work processes, organizations find it difficult to manage the work done by its associates. This may affect the ability of an organization to meet its prior commitments.

Additionally, technological advancements have led the way for business processes to become more and more complex, planning and managing all the activities and resources involved in getting a job done become more challenging. Accordingly, tracking the flow of work through an enterprise requires time and diverse skills and knowledge.

Usually in an enterprise, work occurs in two distinct places viz., desktop (where an individual manipulates artifacts in different information systems) and outside desktop (when an individual attends meetings, presentations, discussions and the like). In both the cases, there is no specific reason as to why an individual chooses to use the desktop in a particular fashion (sequence of events) and/or the nature of work carried out. When the managers and/or supervisors have to draw inferences based on the available data of an individual's work and progress, the data provided by individuals and/or peer members and the data from information systems may be inaccurate and inefficient. Decision making in such situation is analogous to taking calculated risks. To avoid such consequence, managers and/or supervisors need help in making decisions.

Further, managers and/or supervisors need quality data for making plans. In this respect, managers and/or supervisors monitor the progress of delegated work and intervene whenever necessary. Furthermore, managers and/or supervisors need data to take corrective actions when progress of work is not as desired. The managers and/or supervisors may also need early indicators and warnings against any potential failures/slippages. Moreover, they also need data that can help them to take calculated risks. Along with this, the individuals may also need help in reporting the progress of work. In this respect, the individuals may need privacy with respect to the work they are doing. Further, they also need to know the different pieces of work they have accepted and its progress as well as clarity on their work specifications. Subsequently, they may also need data to validate or support their claims on progress, completion and quality of work that is assigned to them.

Currently, the systems for work measurement are approximate, time-consuming and subjective as there are no standard methodologies available for measuring work done in IT systems. As a result, the reported metrics tend to be inconsistent, imprecise and hard to collate.

Hence, there is a need for a system that limits the aforementioned drawbacks and provides a system and method to non-intrusively measure work done in IT systems.

OBJECTS

An object of the present disclosure is to provide non-intrusive sensing and instrumentation of different work processes.

Another object of the present disclosure is to allow individuals and their managers and/or supervisors to track their work process and progress.

Still another object of the present disclosure is to provide a system that protects privacy and freedom of an individual while sensing different work processes carried out by the individual.

Still another object of the present disclosure is to provide a system that non-intrusively monitors and collects information on actual work performed by an individual on his desktop and on virtualized work carried out by an individual during official presentations, seminars and the like.

Still another object of the present disclosure is to establish correlation between the actual work and the virtualized work in order to sense total amount of work carried out along with the method of execution.

Still another object of the present disclosure is to relate work execution metrics with the work processes.

SUMMARY

This summary is provided to introduce concepts related to non-intrusive sensing and instrumentation of work processes performed in Information Technology system, which is further described below in the detailed description. This summary is neither intended to identify essential features of the present disclosure nor is it intended for use in determining or limiting the scope of the present disclosure.

In an embodiment, method(s) and system(s) to non-intrusively sense work processes is disclosed. The method may include providing a pre-defined or user defined collection of work processes which covers the almost entire set of activities performed by the user on a target computing system. The method may further include assigning a meta-data with each and every process step of the work processes. The meta-data provides a list of actual activities being performed by the user on a target computing system. Subsequently, the meta-data may be recorded by querying the target computing system. Further, the method may include obtaining a plurality of measures and their associated parameters for each of the process step of the work processes. The plurality of measures may include a plurality of direct measures and a plurality of indirect measures. To this end, the plurality of obtained measures may be tagged as metrics information for each of the process step of the work processes. The method may further include obtaining a task performance metrics by analysing the plurality of direct measures and the plurality of indirect measures. Further, the method may include collecting a set of atomic actions being performed by the user at a given point of time on the target computing system. Subsequently, the collected sets of atomic actions are compared with the pre-defined/user defined collection of work processes to identify the actual work processes performed by the user on the target computing device. Further, the method may identify task performance measures of the user by comparing the identified work processes with the task performance metrics.

BRIEF DESCRIPTION OF THE ACCOMPANYING DRAWINGS

The detailed description is described with reference to the accompanying figures. In the figures, the left-most digit(s) of a reference number identifies the figure in which the reference number first appears. The same numbers are used throughout the drawings to reference like features and modules.

FIG. 1 illustrates a catalog of Therbligs along with their symbols and a brief description, according to an implementation of the present disclosure.

DETAILED DESCRIPTION

The present disclosure relates to a system and a method of sensing and instrumentation of work processes performed in a computing environment.

Unless specifically stated otherwise as apparent from the following discussions, it is to be appreciated that throughout the present disclosure, discussions utilizing terms such as "providing" or "assigning" or "recording" or "obtaining" or "collecting" or "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The systems and methods are not limited to the specific embodiments described herein. In addition, components of each system and each method can be practiced independently and separately from other components and methods described herein. Each component and method can be used in combination with other components and other methods.

Typically, in an Information Technology (IT) enabled environment, the end users such as a business user, a business supervisor, and a business administrator use their workstation to access all enterprise IT systems. In such IT enabled environment, all business related events are handled and services rendered by using the workstation such as the IT system. Each of the IT system keeps the record of all the transaction conducted by the end users. Additionally, the end user may also conduct multiple set of activities, which straddle across multiple IT system. Further, as part of the management need, the work performance measures of the end user and/or the business user needs to be reported to the organization' patrons. However, the work, which is straddle across multiple IT system, may not be easily measured. Thus, the managers or stakeholders of the organization may not be able to effectively manage the work or supervise the work done by the end users and/or business users.

The present disclosure provides non-intrusive sensing and measuring means to support the managers and/or stakeholders of the organization. The present disclosure provides non-intrusive sensing as a means to reduce/remove human efforts impended in measuring the work done by the end users and/or business users. In this approach, the human activities expended in using the IT systems are sensed and their characteristics are identified. Further, the non-intrusive work measurement approach also supports the managers and/or stakeholders of the organization by providing the improvement of processes and outcomes in the organization. To achieve this, the present disclosure manipulates and interacts with IT systems to facilitate sensing and supports a comprehensive environment for work process definition and recognition using sensors, making use of various tools in a coordinated manner.

Further, the present disclosure directed towards monitoring work processes wherein the end user model their work processes in the IT system. In this respect, the IT system monitors the work/activity work performed by the end users and/or business users and correlates it to the closest work process that has been previously defined in the IT system. Further, each process step is considered as a unit of work to be performed by the end users. However, there are some steps that would represent a complete complex network of actions which when instantiated result in the end user executing the entire network of actions. In this respect, at the lowest level such as on a leaf level in the hierarchy, these units of work represent atomic actions the end user can perform in the IT system. In an exemplary embodiment, such atomic actions are considered as Therbligs for work performed in IT systems. Therbligs are considered to be basic building blocks of all work done by the end user in their IT system. In another exemplary embodiment, the Therbligs are functionally cohesive non-overlapping units of work that provide the intent of the task as realized by the end users.

Further, the IT system as disclosed in the present disclosure may have a pre-defined collection of work processes. The pre-defined collection of work processes almost cover every possible set of actions or activities which may be performed by the end user of the IT system. The pre-defined collection of work process may be a schematic list of actions which may be performed by the end user to complete a particular process on the IT system. The pre-defined collection of work processes may be user defined collection of work processes where the user defined category may belong to the manager or any other stakeholders of the organization.

Furthermore, the pre-defined collection of work processes may include a plurality of process steps which in turn define a particular work process on the IT system. Since, each of the process steps of the work process is bound to actions that may be performed on the IT systems. Thus, the static information pertaining to the each of the process step may include meta-data that may be used to reconstruct the bindings. In this respect, the each of the process steps of the work process is assigned a meta-data. Thus, the meta-data provides a list of actions or activities which may be performed by the end user on the IT system. On a similar note, the meta-data may be recorded by querying the corresponding IT system.

Further, the present disclosure provides a non-intrusive measurement approach to support the manager or management of the organization to improve the work processes and outcomes in an organization. In this respect, the present disclosure may obtain work performance measures of the work processes. More importantly, the work performance measures are indicators that may be used by the managers and/or stakeholders of the organization to statistically control and assist the end users in meeting their desired objectives within the identified delivery constraints. Further, the work performance measures are also critical in identifying the necessary effort to accomplish the given amount of work efficiently and effectively. Furthermore, the work performance measures quantify the accomplished work in IT systems. More specifically, the work performance measures provide a numerical basis of the performance of the end users.

Further, the work performance measures may be expressed as direct measures and indirect measures or derived measures. In another implementation, the direct measures may be referred as primary measures and the indirect measures may be referred as secondary measures. Furthermore, the procurement of the direct measures is dependent on defining variables having well defined computing phenomena related to them. On a similar note, the procurement of the indirect measures is dependent on empirical relationship that may be established on the direct measures.

Typically, the direct measures may be specified by preparing a list of variables or parameters that correlates to the IT system. To this end, the list of variables or parameters is tagged as metrics information to the process step of the corresponding work process. On a similar note, the indirect measures may be specified by preparing a list of variables or parameters, and identifying an associated measurement function of measurable parameters. Further, the measurable parameters are tagged as metrics information to the process step of the corresponding work process.

Since, every process steps of the work processes may have a measurable impact. In this respect, the work performance measures may be obtained from all executed work processes. For example, in the context of work done in IT system, the following work measures may provide insight of the work performance measures:
  a) Productivity—it is a ratio of work done versus impended effort and it may be construed as completion of a collection of work processes within a defined timeframe.
  b) Performance—it is a relative speed with which an end user performs his work and it may be construed as average cycle time consumed when working on a set of work processes.
  c) Throughput—it is a rate at which an end user is able to perform work processes and it may be interpreted as number of times a collection of work processes is performed in a standard timeframe.
  d) Cost—it is an amount of resources consumed by an end user to perform work and it may be interpreted as amount of time, computing resources, physical resources consumed to perform work.

For all the above identified measures, the identified variables may serve as placeholders of measurement. For example, the work performance measure "Cost" may require variables such as computing time, think time and storage size. Similarly, the work performance measure "Productivity" may require variables such as number of work processes and time consumed. Once the work measures are identified along with their associated parameters, it may be bind them to every process step as illustrated in "Table 1" provided below.

TABLE 1 exemplary metrics information associated with process steps

| Metrics | Placeholders | Value |
|---|---|---|
| Cost | Computing Time | |
| | Think Time | |
| | Bandwidth Consumed | |
| | Storage Consumed | |
| Productivity | Process Step count | |
| | Process Count | |
| | Start Time | |
| | End Time | |
| | Total Time Consumed | |

Further, a task performance metrics may be obtained by analyzing the obtained direct measures and indirect measures. In this respect, the analysis of obtained direct measures and indirect measures may be directed towards the analyzing the metrics information tagged with the direct measures and indirect measures. Further, the analysis of metrics information includes applying the measurement function and transforming it to get more metrics information. Finally, the metrics information may be consolidated across all the work processes which provide the holistic view of the work performance measures.

Since, the disclosure provides that the each process step has been considered as a unit of work to be performed by the end users such as a business user. However, there may be some process steps that represent a complete complex network of action which when instantiated may result in the end user executing the entire network of activities. In this respect, at the lowest level such as a leaf level in the hierarchy, these units of work may represent atomic actions as Therbligs for task performed in the IT system. Further, the disclosure is directed towards collecting the set of atomic actions which is performed by the user at a given point of time on the IT system. Furthermore, the disclosure is directed towards identifying the work processes performed by the user on the IT system by correlating the set of atomic actions with the pre-defined collection of the work processes. Subsequently, the task performance measures may be identified by comparing the identified work processes with the task performance metrics.

Further, while describing the work process, every Therblig is bound to a set of properties that details the context of the action to be performed by the end user and a set of parameters that correlate to the work performance parameters that needs to be measured. In this respect, the list of Therblig may be expanded and provide a collection of Role based Therbligs. For example, there is a set of Therbligs for associates providing Business Process Services, another set for Architects, another set for programmers, another set for Managers, another set for Administrator teams, another set for Infrastructure Team etc. Therefore, it may be construed as the work done by the role players may be encoded in such a way that the IT system may understand the role based requirements. In such a scenario, advantagly, disclosing the Therbligs of the IT system users may not be harmful.

The present disclosure describes systems and methods to non-intrusive sensing and instrumentation of work processes performed in computing environment. According to an aspect, the sensing and instrumentation of work processes are based on the plurality of work performance measures obtained by the sensors. Accordingly, in an embodiment, sensing and instrumentation of work processes is implemented in the systems and the methods described herein.

According to an implementation, the present subject matter discloses a non-intrusive sensing and instrumentation of work processes performed in computing environment. In this respect, providing the pre-defined collection of work processes which cover almost the complete range of activities may be performed by the end user on the IT system. In course of the action, each of the process steps of the work processes are assigned with a meta-data. The meta-data provides a list of actual activities being performed by the end user on the IT system. Further, the meta-data are recorded by querying the IT system. Furthermore, the plurality of measures and their associated parameters are obtained. To this end, the plurality of measures includes a plurality of direct measures and a plurality of indirect measures. Further, the plurality of obtained measures are tagged as metrics information for each of the process step of the work processes.

Further, the plurality of direct measures and indirect measures are analysed and in return task performance metrics are obtained. Furthermore, the set of action/task such as atomic actions being performed by the user at a particular point of time are collected. Subsequently, the work processes performed by the user on the IT system are identified by correlating the collected set of atomic actions with the pre-defined collection of work. Finally, a task performance measures are identified by comparing the identified work processes with the task performance metrics.

In another implementation, the set of atomic actions may include Therbligs for task performed on the IT system. Every Therblig may be bound to a set of properties that details the context of the action may be performed by the end user and a set of parameters that correlate to the work performance parameters that needs to be measured. In this respect, the list of Therblig may be expanded and provided with a collection of Role based Therbligs. For example, there may be a set of Therbligs for associates providing Business Process Services, another set for Architects, another set for programmers, another set for Managers, another set for Administrator teams, another set for Infrastructure Team etc. Therefore, it may be construed as the work done by the role players may be encoded in such a way that the IT system may understand the role based requirements. In such a scenario, advantagly, disclosing the Therbligs of the IT system users may not be harmful.

In another implementation, the plurality of measures may be obtained in the following stages of the execution of the process step: before the actual activity being performed, when the activity is performed, and after the activity is completed.

In another implementation, the plurality of obtained measures may be aggregated and/or consolidated by the consolidation function to transform into the task performance measures.

In another implementation, there may be role specific sensors to capture the work done by the end users. For example, the role specific sensors may be construed as a set of sensors for BPS associates, another set for Architects, another set for Programmers, another set for Managers, another set for Administrator teams etc. Thus, based on the role profile, a set of sensors may be configured and capture the information about the role player.

Still yet another aspect of the present disclosure provides a non-transitory computer-readable medium having embodied thereon a computer program for executing a method comprising: providing a pre-defined collection of work processes covering the entire activities performed by a user, assigning each of process step of said work processes with a meta-data, wherein the meta-data providing a list of activities being performed by the user on the target computing system, recording the meta-data by querying the target computing system, obtaining a plurality of measures and their associated parameters for each of the process step of said work processes, wherein the plurality of measures include a plurality of direct measures, and a plurality of indirect measures, and wherein the plurality of obtained measures are tagged as metrics information for each of the process step of said work processes, obtaining a task performance metrics by analyzing the plurality of direct measures and the plurality of indirect measures, collecting a set of atomic actions being performed by the user at a particular point of time on the target computing system, identifying the work processes performed by the user on the target computing system by correlating the set of atomic actions with the pre-defined collection of work processes, and identifying a task performance measures of the user by comparing the identified work processes with the task performance metrics.

These and other advantages of the present subject matter would be described in greater detail in conjunction with the following figures. While aspects of described systems and methods to non-intrusive sensing and instrumentation of work processes may be implemented in any number of different computing systems, environments, and/or configurations, the embodiments are described in the context of the following exemplary system(s).

FIG. 1 illustrates a catalogue 100 of Therbligs along with their symbols and a brief description, in accordance with an embodiment of the present disclosure. The classification of Therbligs is based on two factors namely emphasis for business users performing a variety of work activities and effectiveness in the context of accomplishment of work.

In the system of the present disclosure, while describing the work process, every Therblig is bound to a set of properties that details the context of the action to be performed by a business user and a set of parameters that correlate to the work performance parameters that needs to be measured. The system of the present disclosure uses a simple directed graph to express work processes. The nodes of the directed graph represent process steps; edges represent the relationships between the process steps and the arrow direction in the edges indicates the direction of flow. There can be one or more edges between nodes to represent the different type of direct relationships that can exist between the nodes. If there is no edge between nodes then there is no direct relationship between the nodes. This structure of work processes is expressed by drawing a graphical depiction wherein it is assumed that the process steps have a single unified representation of the process steps the different type of relationships between the process steps.

In the system of the present disclosure, each process step, may also be known as node, in a work process is represented by a Therblig symbol as illustrated in FIG. 1 which describes the action that is planned to be performed when the step is executed. It includes a label (step-name) and a description which can be used to provide detailed information about the step. Some information pertaining to the work to be done cannot be represented graphically and it is attached to process steps as static information (this static information includes parameters that are necessary for performing write actions in a user interface). Every process step may be bind to actions that can be performed in various IT systems. The static information pertaining to the steps contain meta-data that can be used to reconstruct these bindings. An interrogation mechanism is then applied to record the meta-data by querying the corresponding IT system. Additionally, there exist predefined rules that govern the use of Therbligs (for e.g., only one start symbol is allowed) as part of the work process. These rules govern parameters including count and relationship between represented Therbligs.

Each relationship between the represented Therbligs is described by a directed edge on a simple directed graph indicating the flow of information. The types of relationships that govern edges are of two kinds, a) control flow and b) information flow. The former expresses ordering/sequencing of steps in the overall execution schema and later expresses flow of information between the connected steps. While control flow details the order in which the steps are to be executed, data flow details the kind of information that will serve as input to a process step and the kind of information that will serve as output of the process step. There are certain predefined rules based on the kind of relationship that govern the establishment of relationships between two steps. These rules govern the type of relationship between steps and also the direction of relationship flow.

Figure 2:
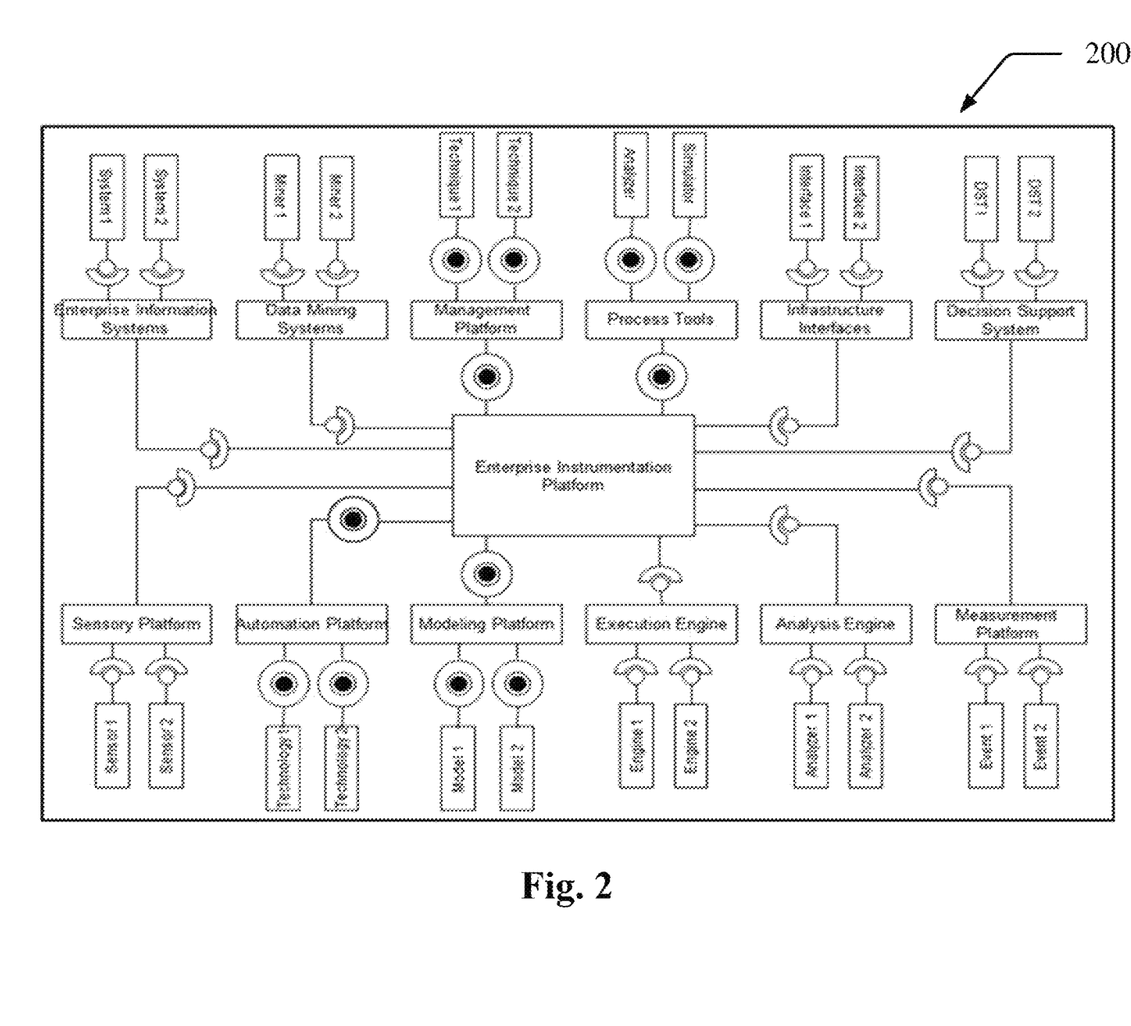
FIG. 2 illustrates the components involved in providing non-intrusive sensing and instrumentation of work processes in IT systems, according to an implementation of the present disclosure.

FIG. 2 illustrates the components involved in the enterprise instrumentation platform system 200 that provides non-intrusive sensing and instrumentation of work processes in IT systems, in accordance with an embodiment of the present disclosure. The system 200 aims to consume few computing resources while sensing work processes through a sensory platform so that resource starvation can be limited. It utilizes the components and functionalities exposed by an enterprise information systems module to sense work processes whenever it is available. It includes interfaces to computing resources that need to be manipulated. The system 200 senses information from the information systems without modifying or tampering the systems. The system 200 includes infrastructure interfaces that establish connection to an appropriate information system when required. The established connection is only released after completion of tasks. Redundant infrastructure interfaces are present in the system 200 for connecting to various information systems.

The system 200 monitors hardware events, operating system events, information system events and human-machine interaction events through a measurement platform and acts when they are triggered. It also monitors the operating environment in which the individual operates and act when predefined work process conditions are met. The system has the ability to recognize a specific work process from a modeling platform based on the sequence of events that is triggered by an individual while working on their IT systems. This recognition is based on a set of pre-defined rules and conditions defined in an execution engine. The system 200 also has the ability to extract information from different output and storage devices through the use of data mining systems and intercept the available information in input devices through the measurement platform.

Further, the system 200 of the present disclosure is privacy compliant. Information is not extracted from any information systems stored by the system 200 in local computing resources unless explicitly specified. Similarly, the system 200 is also security compliant as credentials are not extracted from information systems nor are they stored in the local computing resources unless explicitly specified. Each infrastructure interface is designed as an independent component and is bound to the system 200 by using standard predefined interfaces. These interfaces bind to target applications on demand and they are backward compatible. There are multiple ways to sense a work process through the sensory platform and individuals are in a position to select appropriate ways that suit their needs based on constraints faced by them. Individuals can define alternate rules and conditions for sensing a work process. A collection of work processes can be stringed together along with their outcomes in a recursive process to create a higher level work process. The effort impended on stringing together multiple work processes and their outcome is minimal as it involves simple drag and drop operations. There exists a structured, systematic approach that allows an individual to share work processes.

Further, the system 200 provides a language and associated grammar for expressing these work processes (Therbligs for IT systems work). The system 200 has infrastructure interfaces to other systems where the interface adapters that are provided can communicate, manipulate and gather information from other systems. The system 200 also includes interrogation mechanisms to aid individuals in establishing interface adapters to other systems. Additionally, the system 200 allows individuals to redefine their work processes that they have defined earlier to reflect the change in the nature of their work. Individuals can define the pre-condition, post condition and exit criteria of their work processes.

Figure 3:
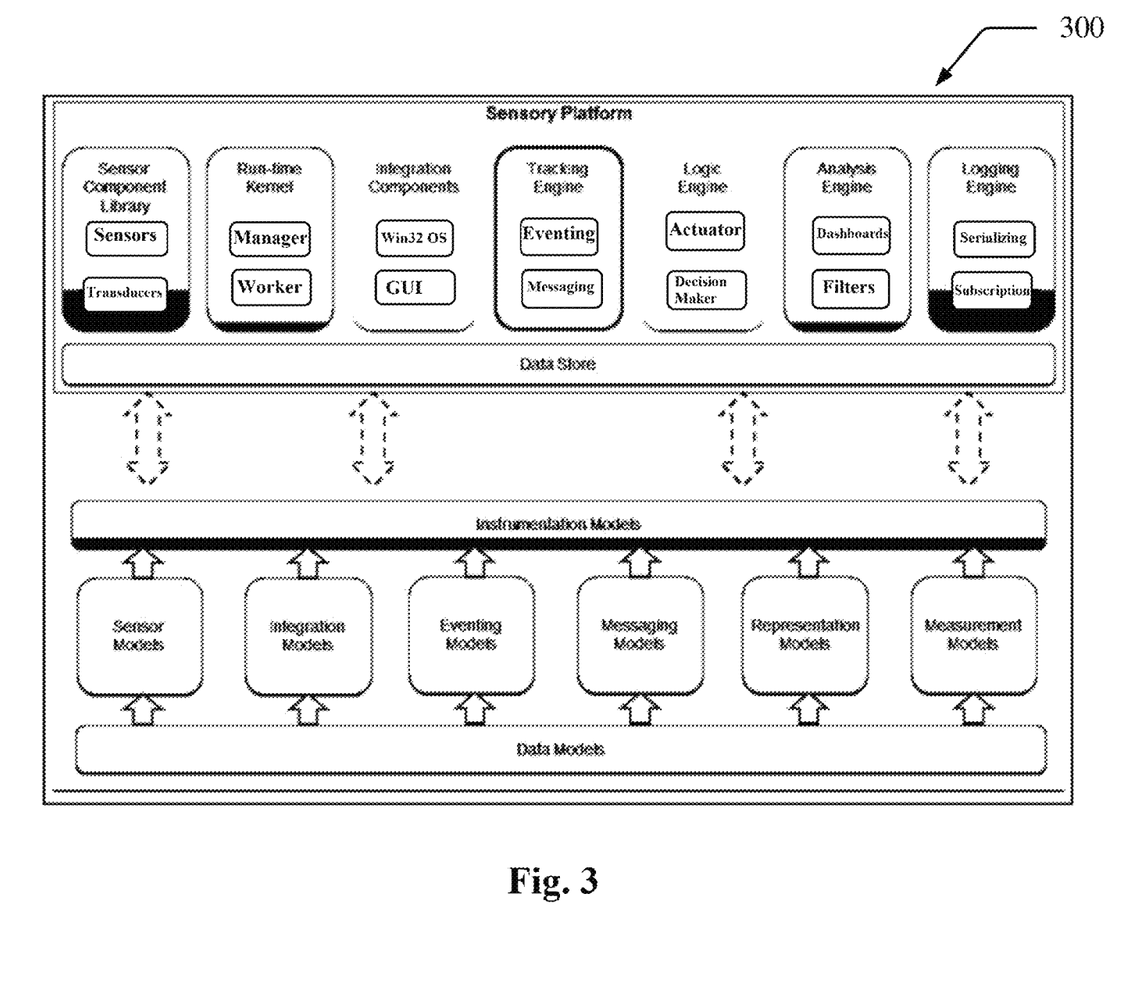
FIG. 3 illustrates the components of sensory platform involved in obtaining the plurality of measures including the direct measures and indirect measures, according to an implementation of the present disclosure.

FIG. 3 illustrates a sensory platform 300 implemented in a non-intrusive system 602, in accordance with an embodiment of the present disclosure. In said embodiment, the sensory platform 300 includes a sensor component library, a run-time kernel, an integration component, a tracking engine, a logic engine, an analysis engine and a logging engine to implement the sensory platform 300 in accordance with the embodiment of the present disclosure. Further, the sensory platform 300 includes a sensor models, integration models, eventing models, messaging models, representation models and a measurement models which in turn communicate with the data models and an instrumentation models to implement the sensory platform 300 in accordance with the embodiment of the present disclosure.

Figure 4:
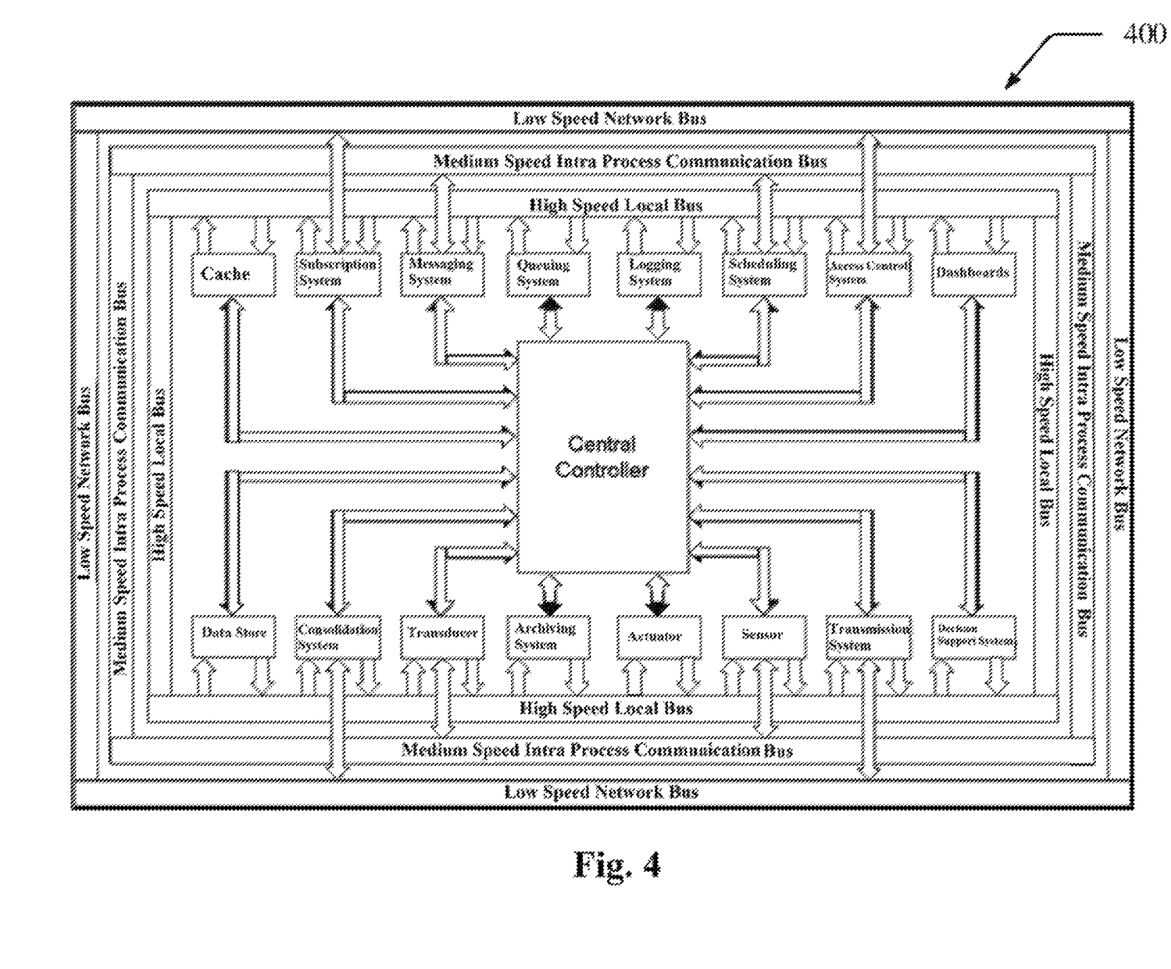
FIG. 4 illustrates the architecture of central controller communicating with various components of the non-intrusive system, according to an implementation of the present disclosure.

FIG. 4 illustrates a architecture 400 of central controller communicating with various components of the non-intrusive system, according to an implementation of the present disclosure. The architecture of the central controller communicating with various components of the non-intrusive system in accordance with the embodiment of the present disclosure. The architecture 400 may include a low speed network bus communicatively attached with a medium speed intra process communication bus and a high speed local bus. The high speed local bus may be in direct communication with the various components and sub-systems including a data store, a consolidation system, a transducer module, an archiving system, an actuator module, a sensor platform, a transmission system, a decision support system, a cache module, a subscription system, a messaging system, a queuing system, a logging system, a scheduling system, an access control system and a dashboard module. The central controller may be in direct communication with above mentioned modules and sub-systems.

Figure 5:
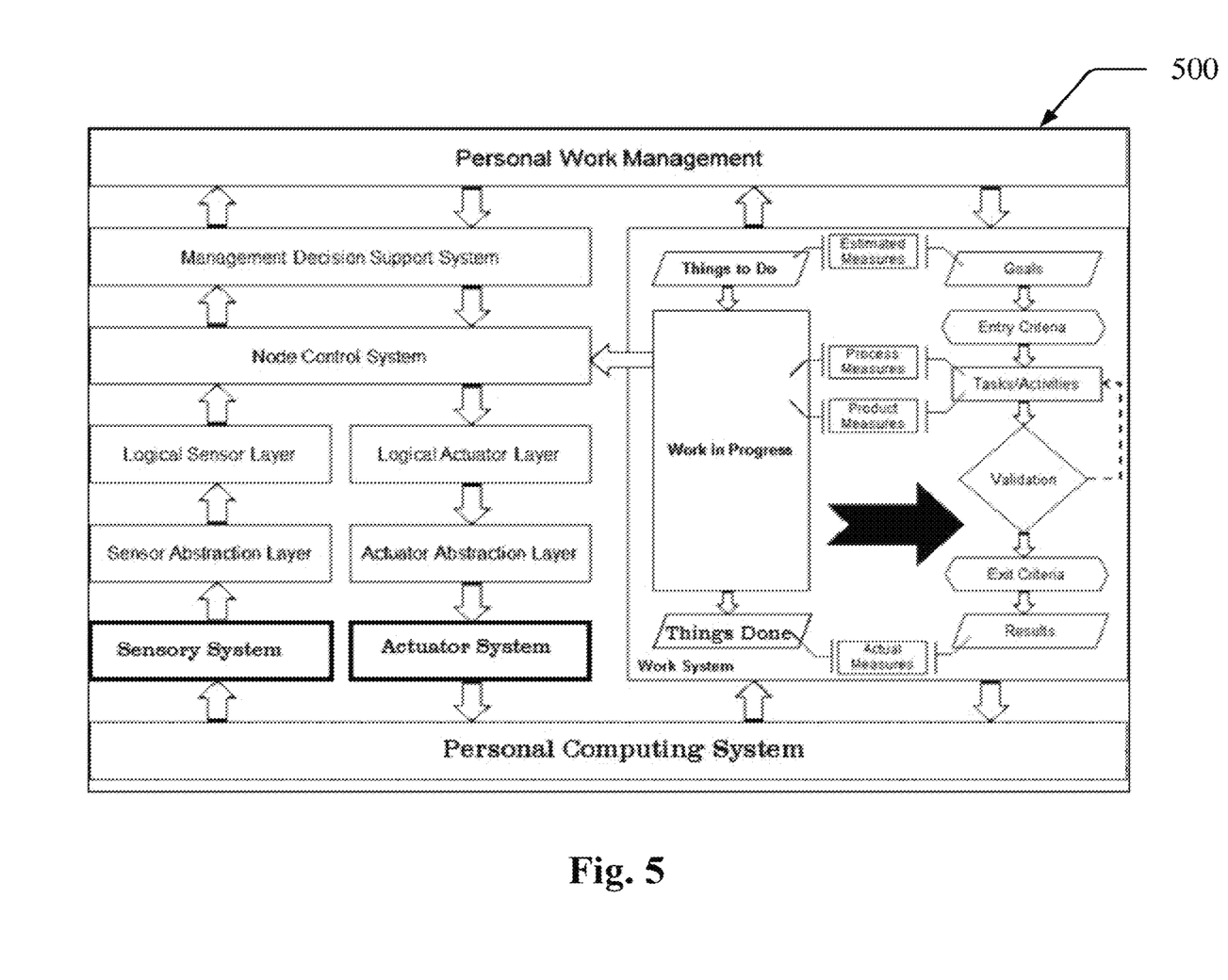
FIG. 5 illustrates an exemplary work sensing process depicting personal work management on a personal computing system, in accordance with an embodiment of the present disclosure.

FIG. 5 illustrates an exemplary work sensing process 500 depicting personal work management on a personal computing system, in accordance with an embodiment of the present disclosure. The exemplary work sensing process 500 may include a personal computing system in communication with various sub-systems and modules as provided in accordance with the embodiment of the present disclosure. The personal computing system may be in communication with a sensory system to obtain a plurality of measures and their associated parameters for the process step of the work process. Subsequently, the measures may be processed by a sensor abstraction layer and a logical sensor layer and breaks down the plurality of sensor into a plurality of direct measures and a plurality of indirect measures. These measures may be provided to the node control system which in parallel provided the identified work processes performed by the user on the personal computing system. The node control system may identify the task performance measures by comparing the identified work processes with the task performance metrics. Further, it may be communicated to the management decision support system in accordance with the embodiment of the present disclosure.

Figure 6:
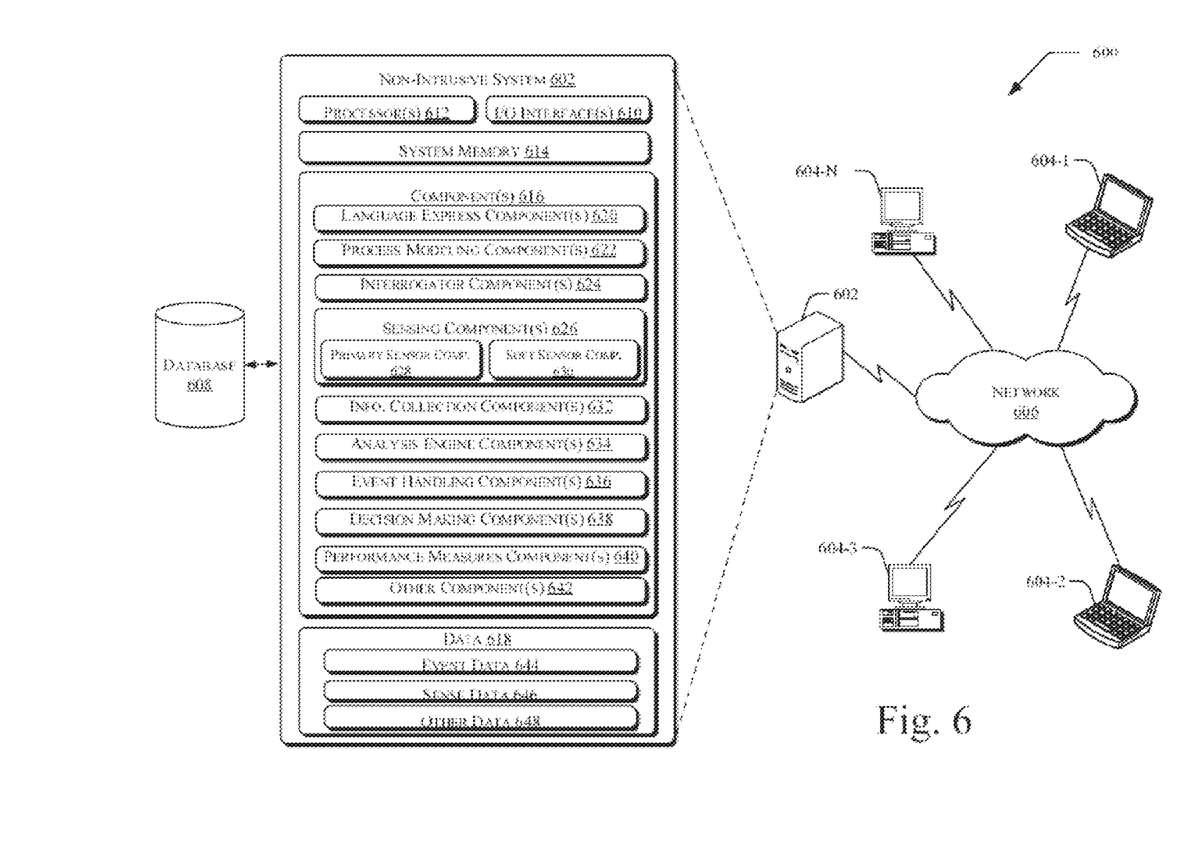
FIG. 6 illustrates a network environment implementation of a non-intrusive system to sense and measure work processes, in accordance with an embodiment of the present disclosure.

FIG. 6 illustrates a network environment 600 implementing a non-intrusive system 602, in accordance with an embodiment of the present disclosure. In said embodiment, the network environment 600 includes the non-intrusive system 602 configured to sense and measure work processes in a target computing systems (604-1 to 604-N). The non-intrusive system 602 includes a language express component 620, a process modeling component 622, an interrogator component 624, a sensing component 626, an information collection component 632, an analysis engine component 634, an event handling component 636, a decision making component 638, and a performance measures component 640 for eliciting the requirement of sensing and measure work processes in the target computing systems (604-N).

In one implementation, the network environment 600 may be a company network, including thousands of office personal computers, laptops, various servers, such as blade servers, and other computing devices. Examples of a company may include an information technology (IT) company, a product manufacturing company, a human resource (HR) company, a telecommunication company, or other large conglomerates. It will also be appreciated by a person skilled in the art that the company may be any company involved in any line of business. In another implementation, the network environment 600 may be a smaller private network. In yet another implementation, the network environment 600 may be a public network, such a public cloud.

The non-intrusive system 602 may be implemented in a variety of computing systems, such as a laptop computer, a desktop computer, a notebook, a workstation, a mainframe computer, a server, a network server, and the like. In one implementation, the non-intrusive system 602 may be included within an existing information technology infrastructure or a database management structure. Further, it will be understood that the non-intrusive system 602 may be connected to a plurality of computing systems 604-1, 604-2, 604-3, . . . , 604-N, collectively referred to as the target computing system 604 or as an individual IT system 604. The target computing system 604 may include, but is not limited to, a desktop computer, a portable computer, a mobile phone, a handheld device, and a workstation. The target computing system 604 may be used by users, such as business users, database analysts, programmers, developers, data architects, software architects, module leaders, projects leaders, database administrator (DBA), stakeholders, and the like.

As shown in the figure, the target computing system 604 are communicatively coupled to the non-intrusive system 602 over a network 606 through one or more communication links for facilitating one or more end users to access and operate the non-intrusive system 602. In one implementation, the network 606 may be a wireless network, a wired network, or a combination thereof. The network 606 may also be an individual network or a collection of many such individual networks, interconnected with each other and functioning as a single large network, e.g., the Internet or an intranet. The network 606 may be implemented as one of the different types of networks, such as intranet, local area network (LAN), wide area network (WAN), the internet, and such. The network 606 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 606 may include a variety of network devices, including routers, bridges, servers, computing devices, storage devices, and the like.

In an implementation, the non-intrusive system 602 may be coupled to a database 608. It will be understood that the database 608 may also be connected to the network 606 or any other network in the network environment 600. In an implementation, the database 608 may include various input files and supporting files that may be used by the non-intrusive system 602. In an implementation, the database 608 may be provided as a relational database and may store data in various formats, such as relational tables, object oriented relational tables, indexed tables. However, it will be understood that the database 608 may be provided as other types of databases, such as operational databases, analytical databases, hierarchical databases, and distributed or network databases.

The non-intrusive system 602 further includes interface(s) 610, for example, to provide the input data in a hierarchical manner. Further, the interface(s) 610 may include a variety of software and hardware interfaces, for example, interfaces for peripheral device(s), such as a keyboard, a mouse, an external memory, and a printer. Additionally, the interface(s) 610 may enable the non-intrusive system 602 to communicate with other devices, such as web servers and external repositories. The interface(s) 610 may also facilitate multiple communications within a wide variety of networks and protocol types, including wired networks, for example, LAN, cable, etc., and wireless networks, such as WLAN, cellular, or satellite. For the purpose, the interface(s) 610 may include one or more ports.

In an implementation, the non-intrusive system 602 includes a processor(s) 612 coupled to a system memory 614. The processor(s) 612 may be implemented as one or more microprocessors, microcomputers, microcontrollers, digital signal processors, central processing units, state machines, logic circuitries, and/or any devices that manipulate signals based on operational instructions. Among other capabilities, the processor(s) 612 may be configured to fetch and execute computer-readable instructions stored in the system memory 614.

The system memory 614 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the non-intrusive system 602 includes component(s) 616 and data 218. The component(s) 616 include, for example, a language express component 620, a process modeling component 622, an interrogator component 624, a sensing component 626, an information collection component 632, an analysis engine component 634, an event handling component 636, a decision making component 638, a performance measures component 640 and other component(s) 642. The other component(s) 642 may include programs or coded instructions that supplement applications or functions performed by the non-intrusive system 602.

The data 618 may include event data 644, sense data 646, and other data 648. The other data 648, amongst other things, may serve as a repository for storing data that is processed, received, or generated as a result of the execution of one or more modules in the component(s) 616. Although the data 618 is shown internal to the non-intrusive system 602, it may be understood that the data 618 can reside in an external repository (not shown in the figure), which may be coupled to the non-intrusive system 602. The non-intrusive system 602 may communicate with the external repository through the interface(s) 610 to obtain information from the data 618.

As mentioned herein, the present disclosure provides a non-intrusive sensing and instrumentation of work processes performed in computing environment. Accordingly, the sensing and measure work processes in a target computing system is implemented in the systems and the methods described herein.

In an implementation, the non-intrusive system 602 may provide information about the actual work processes being followed by the end user. The non-intrusive system 602 may include the language express component 620 configured to provide a pre-defined collection of work processes covering the entire list of activities being performed by the user. The language express component 620 may also be provided to configure to provide primitive building blocks for constructing the work processes such as Therbligs for IT systems.

According to the present implementation, the non-intrusive system 602 may include the process modeling component 622 to utilize the model work processes that the end user may follow while performing their work. The process modeling component 622 may further configured to assign each of the process step of the work processes with a meta-data. The meta-data may provide a list of activities being performed by the end user on the target computing system 604. Further, the non-intrusive system 602 may also include the interrogator component 624 that may be configured to query the target computing system 604 for configuration information. The interrogator component 624 may also configured to record the meta-data based on the queried computing system 604.

According to the present implementation, the non-intrusive system 602 may also include the sensing component 626 that may be configured to obtain a plurality of measures and their associated parameters for each of the process step of the work processes. The plurality of measures may include a plurality of direct measures and a plurality of indirect measures. Further, the direct measures may also be referred as primary measures and the indirect measures as secondary measures. Furthermore, a primary sensor component 628 may be configured to obtain the direct measures. Further, the obtaining on the direct measures may also be dependent on variables having well defined computing phenomena related to them. On a similar note, a soft sensor component 630 may be configured to obtain the indirect measures. Further, the obtaining of the indirect measures may also be dependent on empirical relationship that can be established by the direct measures.

According to the present implementation, the direct measures may be specified by preparing a list of variables or parameters that correlates to the end computing system 604. To this end, the list of variables or parameters may be tagged, by the information collection component 632, as metrics information to the process step of the corresponding work process. On a similar note, the indirect measures may be specified by preparing a list of variables or parameters, and identifying an associated measurement function of measurable parameters. Further, the measurable parameters are tagged, by the information collection component 632, as metrics information to the process step of the corresponding work process.

According to the present implementation, the non-intrusive system 602 may also include the analysis engine component 634 that may be configured to obtain the task performance metrics by analyzing the plurality of direct measures and the plurality of indirect measures. Further, the analysis engine component 634 may also be configured to capture the work done by the end users based on role specific sensors. For example, the role specific sensors may be construed as a set of sensors for BPS associates, another set for Architects, another set for Programmers, another set for Managers, another set for Administrator teams etc. Thus, based on the role profile, a set of sensors may be configured and capture the information about the role players.

According to the present implementation, the non-intrusive system 602 may also include the event handling component 636 that may be configured to collect a set of atomic actions being performed by the end user at a given point of time on the target computing system 604. The set of atomic actions may include Therbligs for task performed on the target computing system 604. Every Therblig may be bound to a set of properties that details the context of the action may be performed by the end user and a set of parameters that correlate to the work performance parameters that needs to be measured. In this respect, the list of Therblig may be expanded and provided with a collection of Role based Therbligs. For example, there may be a set of Therbligs for associates providing Business Process Services, another set for Architects, another set for programmers, another set for Managers, another set for Administrator teams, another set for Infrastructure Team etc. Therefore, it may be construed as the work done by the role players may be encoded in such a way that the IT system may understand the role based requirements.

According to the present implementation, the non-intrusive system 602 may also include the decision making component 638 that may be configured to identify the work processes performed by the end user on the target computing system 604. The identification of the work processes may be based on the correlation of set of atomic actions with the pre-defined collection of work processes by the decision making component 638. The decision making component 638 may also configured to decide the future course of action based on the pre-defined rules and conditions associated to the work processes.

According to the present implementation, the non-intrusive system 602 may also include the performance measures component 640 that may be configured to identify the task performance measures by comparing the identified work processes with the task performance metrics. Additionally, the aggregation and/or consolidation components may be configured to transform the obtained plurality of measures for all process steps into the work performance measures for the entire work processes.

In another implementation, the soft sensor component (630) may configure to obtain the plurality of indirect measures by using the direct measures and a measurement function.

In another implementation, a monitoring component (642) may configure to monitor hardware events, operating system events, information system events, human-machine interaction events and task on a plurality of triggering conditions.

In another implementation, the decision making component (638) may configure to distinguish a specific work process based on the sequence of events triggered by the end user. Further, the decision making component (638) may also be configure to distinguish a specific work process based on a set of pre-defined rules and conditions by the end user.

In another implementation, the non-intrusive system (602) may be configured to re-define the collection of work processes by the end user based on the change in the nature of work processes followed by the end user. Further, the non-intrusive system (602) may also be configure to re-define the pre-condition, post-condition, and exit criteria of the collection of work processes attached with the target computing system (604).

Figure 7:
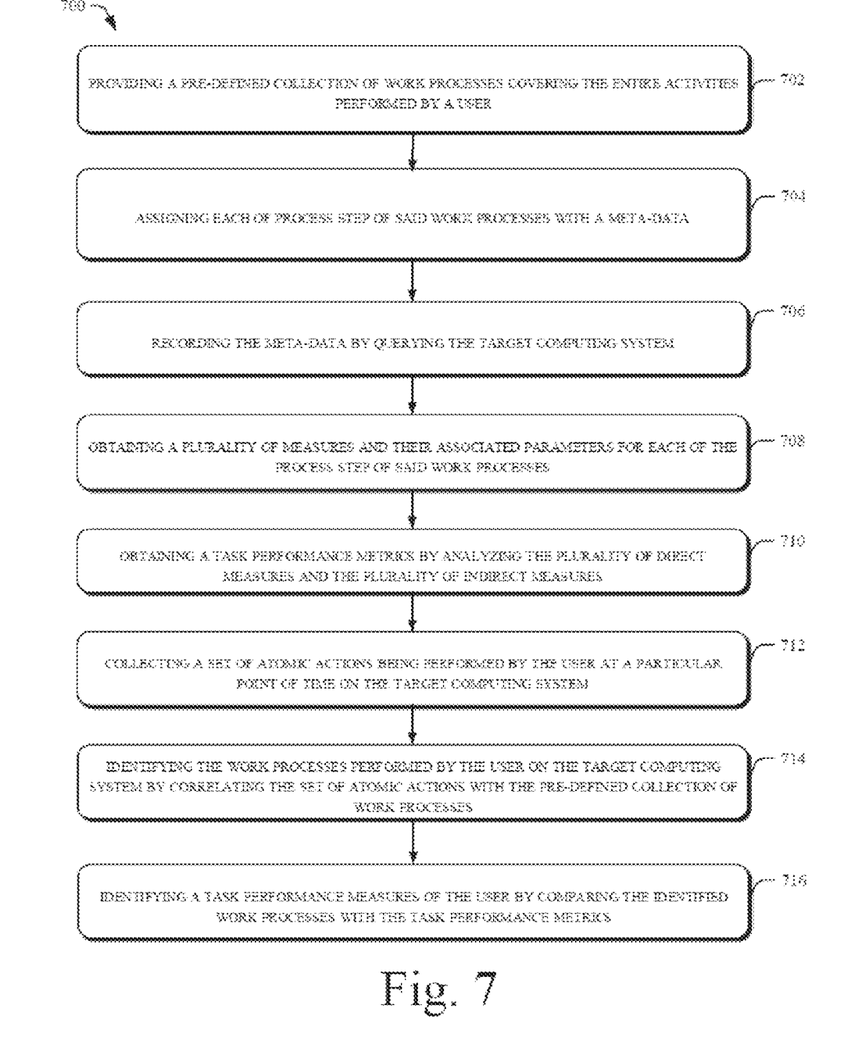
FIG. 7 shows a flowchart illustrating a method to non-intrusively sense work processes in a computing environment, in accordance with an embodiment of the present disclosure.

FIG. 7 illustrates a computer implemented method 700 to non-intrusively sense and measure work processes in the target computing system (604). The method 700 may be described in the general context of computer executable instructions. Generally, computer executable instructions can include routines, programs, objects, components, data structures, procedures, modules, functions that perform particular functions or implement particular abstract data types. The methods 700 may also be practiced in a distributed computing environment where functions are performed by remote processing devices that are linked through a communication network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternative methods. Additionally, individual blocks may be deleted from the method 700 without departing from the spirit and scope of the subject matter described herein. Furthermore, the method 700 can be implemented in any suitable hardware, software, firmware, or combination thereof.

At block 702, the method 700 may include providing the pre-defined collection of work processes covering the entire activities performed by the end user. In an implementation, the language express component 620 may be configured to provide a pre-defined collection of work processes covering the entire list of activities being performed by the end user. The language express component 620 may also be provided to configure to provide primitive building blocks for constructing the work processes such as Therbligs for IT systems.

At block 704, the method 700 may include assigning the each of process step of the work processes with a meta-data, wherein the meta-data may provide a list of activities being performed by the user on the target computing system 604. In an implementation, the process modeling component 622 may configured to assign each of the process step of the work processes with a meta-data. In another implementation, the process modeling component 622 may also be utilize the model work processes that the end user may follow while performing their work.

At block 706, the method 700 may include recording the meta-data by querying the target computing system 604. In an implementation, the interrogator component 624 may also configured to record the meta-data based on the queried computing system 604. In another implementation, the interrogator component 624 may also be configured to query the target computing system 604 for configuration information.

At block 708, the method 700 may include obtaining the plurality of measures and their associated parameters for each of the process step of the work processes wherein the plurality of measures include a plurality of direct measures, and a plurality of indirect measures. In an implementation, the sensing component 626 may be configured to obtain a plurality of measures and their associated parameters for each of the process step of the work processes. The plurality of measures may include the plurality of direct measures and the plurality of indirect measures. In another implementation, the primary sensor component 628 may be configured to obtain the direct measures. Further, the obtaining on the direct measures may also be dependent on variables having well defined computing phenomena related to them. In another implementation, the soft sensor component 630 may be configured to obtain the indirect measures. Further, the obtaining of the indirect measures may also be dependent on empirical relationship that can be established by the direct measures.

At block 710, the method 700 may include obtaining a task performance metrics by analyzing the plurality of direct measures and the plurality of indirect measures. In an implementation, the analysis engine component 634 may be configured to obtain the task performance metrics by analyzing the plurality of direct measures and the plurality of indirect measures. In another implementation, the analysis engine component 634 may also be configured to capture the work done by the end users based on role specific sensors.

At block 712, the method 700 may include collecting a set of atomic actions being performed by the user at a particular point of time on the target computing system 604. In an implementation, the event handling component 636 may be configured to collect a set of atomic actions being performed by the end user at a given point of time on the target computing system 604. The set of atomic actions may include Therbligs for task performed on the target computing system 604.

At block 714, the method 700 may include identifying the work processes performed by the user on the target computing system 604 by correlating the set of atomic actions with the pre-defined collection of work processes. In an implementation, the decision making component 638 may be configured to identify the work processes performed by the end user on the target computing system 604. The identification of the work processes may be based on the correlation of set of atomic actions with the pre-defined collection of work processes by the decision making component 638. In another implementation, the decision making component 638 may also configured to decide the future course of action based on the pre-defined rules and conditions associated to the work processes.

Further, at block 716, the method 700 may include identifying task performance measures of the user by comparing the identified work processes with the task performance metrics. In an implementation, the performance measures component 640 may be configured to identify the task performance measures by comparing the identified work processes with the task performance metrics.

Although implementations for determining consumption of resources have been described in language specific to structural features and/or method, it is to be understood that the appended claims are not necessarily limited to the specific features or method described. Rather, the specific features and method are disclosed as exemplary implementations for determining consumption of resources.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer implemented method to non-intrusively sense and measure work processes in a target computing system (604) having a system processing unit (612), the method comprising:
   providing a pre-defined collection of work processes covering the entire activities performed by a user;
   assigning each of a process step of said work processes with a meta-data, wherein said meta-data provides a multiple set of activities;
   recording the meta-data by querying the target computing system (604);
   obtaining a plurality of measures and their associated parameters for each of the process step of said work processes, wherein the plurality of measures include a plurality of direct measures and a plurality of indirect measures, and the plurality of direct measures and the plurality of indirect measures are tagged as metrics information for each of the process step of said work processes, wherein said metrics information includes computing time, think time (an amount of time the user waits between actions), bandwidth consumed, storage consumed, process step count, process count (a number of processes per address space), start time, end time, and total time consumed;
   obtaining a task performance metrics by analyzing the plurality of direct measures and the plurality of indirect measures, wherein the plurality of indirect measures is identified by using the direct measures and a measurement function;
   collecting a set of atomic actions being performed by the user at a particular point of time on the target computing system (604), wherein the set of atomic actions include Therbligs for a task performed on the target computing system (604), wherein said Therbligs are a set of fundamental elemental motions that describes standardized activities required by an individual to perform a manual task in a workplace;
   identifying the work processes performed by the user on the target computing system (604) by correlating the set of atomic actions with the predefined collection of work processes;
   identifying task performance measures of the user by comparing the identified work processes with the task performance metrics;
   deciding a future course of action based on the pre-defined rules and conditions associated to the pre-defined collection of work processes; and
   executing the future course of action.

2. The method as claimed in claim 1, wherein each of the Therblig is bound to a set of properties that provides a context of each task to be performed by the user.

3. The method as claimed in claim 1, wherein each of the Therblig is bound to a set of parameters that correlates to task performance parameters.

4. The method as claimed in claim 1, wherein each of the Therblig is either a system specific based Therblig or a role specific based Therblig.

5. The method as claimed in claim 1, wherein the task performance parameters include cycle time, efficiency, cost, robustness, and reliability.

6. The method as claimed in claim 1, wherein the plurality of measures is obtained during the execution of the process step of said work processes, before the actual activity being performed, when the activity is being performed, and after the activity is completed.

7. The method as claimed in claim 1, wherein the method further comprises an aggregation and/or a consolidation function to transform the plurality of obtained measures to the task performance measures.

8. A computer-implemented non-intrusive system (602) to sense and measure work processes in a target computing system (604) comprising:
   a system processing unit (612); and
   a system memory (614) coupled to the system processing unit (612) comprising:
      a language express component (620) configured to provide a pre-defined collection of work processes covering the entire activities performed by a user;
      a process modeling component (622) configured to assign each of a process step of said work processes with a meta-data, wherein the meta-data provides a list of activities;
      an interrogator component (624) configured to record the meta-data by querying the target computing system (604);
      a sensing component (626) configured to obtain a plurality of measures and their associated parameters for each of the process steps of said work processes, wherein said sensing component (626) includes a primary sensor component (628) configured to obtain a plurality of direct measures, and a soft sensor component (630) configured to obtain a plurality of indirect measures, wherein the soft sensor component is further configured to obtain a plurality of indirect measures by using the direct measures and a measurement function, wherein said parameters includes computing time, think time (an amount of time the user waits between actions), bandwidth consumed, storage consumed, process step count, process count (a number of processes per address space), start time, end time, and total time consumed;
      an information collection component (632) configured to tag the plurality of direct measures and the plurality of indirect measures as metrics information for each of the process step of said work processes, and bind the plurality of measures with each of the process step of said work processes;
      an analysis engine component (634) configured to obtain a task performance metrics by analyzing the plurality of direct measures and the plurality of indirect measures;
      an event handling component (636) configured to collect a set of atomic actions being performed by the user at a particular point of time on the target computing system (604), wherein the set of atomic actions include Therbligs that are configured to perform a tasks on the target computing system (604);
      a decision making component (638) configured to identify the work processes performed by the user on the target computing system (604) by correlating the set of atomic actions with the pre-defined collection of work processes;

a performance measures component (640) configured to identify the task performance measures of the user by comparing the identified work processes with the task performance metrics;

a component to decide a future course of action based on the pre-defined rules and conditions associated to the pre-defined collection of work processes; and a component to execute the future course of action.

9. The system (602) as claimed in claim 8, wherein each Therblig is further configured to bind to a set of properties that provides a context of each of said task to be performed by the user.

10. The system (602) as claimed in claim 8, wherein each Therblig is further configured to bind to a set of parameters that correlate to task performance parameters.

11. The system (602) as claimed in claim 8, wherein the sensing component (626) is role specific which is configured to capture the information of a specific work process of the user based on a role profile.

12. The system (602) as claimed in claim 8, comprises a monitoring component (642) that is configured to monitor hardware events, operating system events, information system events, human-machine interaction events and a task on a plurality of triggering conditions.

13. The system (602) as claimed in claim 8, wherein the decision making component (638) is further configured to distinguish a specific work process based on a sequence of events triggered by the user.

14. The system (602) as claimed in claim 8, wherein the decision making components (638) is further configured to distinguish the specific work process based on a set of pre-defined rules and conditions by the user.

15. The system (602) as claimed in claim 8, wherein the system (602) is further configured to re-define the collection of work processes by the user based on the change in the nature of work processes followed by the user.

16. The system (602) as claimed in claim 8, wherein the system (602) is further configured to re-define the pre-condition, post-condition, and exit criteria of the collection of work processes attached with the target computing system (604).

17. A non-transitory computer-readable medium having embodied thereon a computer program for executing a method comprising:

providing a pre-defined collection of work processes covering the entire activities performed by a user;

assigning each of a process step of said work processes with a meta-data, wherein the meta-data provides a multiple set of activities;

recording the meta-data by querying the target computing system (604);

obtaining a plurality of measures and their associated parameters for each of the process step of said work processes, wherein the plurality of measures include a plurality of direct measures and a plurality of indirect measures, the plurality of indirect measures identified by using the direct measures and a measurement function, and wherein the plurality of direct measures and the plurality of indirect measures are tagged as metrics information for each of the process step of said work processes, wherein said parameters includes computing time, think time (an amount of time the user waits between actions), bandwidth consumed, storage consumed, process step count, process count (a number of processes per address space), start time, end time, and total time consumed;

obtaining a task performance metrics by analyzing the plurality of direct measures and the plurality of indirect measures;

collecting a set of atomic actions being performed by the user at a particular point of time on the target computing system (604), wherein the set of atomic actions include Therbligs for task performed on the target computing system (604), wherein said Therbligs are a set of fundamental elemental motions that describes standardized activities required by an individual to perform a manual task in a workplace;

identifying the work processes performed by the user on the target computing system (604) by correlating the set of atomic actions with the pre-defined collection of work processes;

identifying task performance measures of the user by comparing the identified work processes with the task performance metrics;

deciding a future course of action based on the pre-defined rules and conditions associated to the pre-defined collection of work processes; and executing the future course of action.

\* \* \* \* \*